3,479,513
PATTERN FOLLOWER CONFINING FIELDS OF
VIEW OF TWO SCANNING PHOTOCELLS
WITHIN CONICAL SURFACES OVERLAPPING
AT PATTERN
Robert G. Simpson, Burlington, Ontario, Ronald J. Luker,
Hamilton, Ontario, and George S. Jewell, Ancaster,
Ontario, Canada, assignors to Canadian Westinghouse
Company Limited, Hamilton, Ontario, Canada, a
Canadian company
Filed Oct. 19, 1965, Ser. No. 497,993
Claims priority, application Canada, Apr. 17, 1965,
928,435
Int. Cl. G05b 1/01
U.S. Cl. 250—202
4 Claims

ABSTRACT OF THE DISCLOSURE

A line tracer including a two photcell tracing head steered by a direct current motor. The viewing angles of the photocells overlap and provide a continuous signal indicative of the relative overlap of the viewing angles and the line. The signals are used to control a controlled rectifier and transistor bridge which in turn controls the direction and speed of rotation of the direct current steering motor.

---

This invention relates to optical pattern followers and in particular to pattern followers intended for controlling machines to cause them to move in accordance with a predetermined optical pattern.

Numerous systems have been provided in the past for optically controlling a tool in such a way that the tool follows a pattern which optically differs from its background.

It should be pointed out that these following systems fall into two classes. Those which follow a line, that is a long thin mark which has a different optical characteristic from its background and those which follow an edge, that is a change in optical characteristic between two relatively continuous surfaces.

Such systems are not inherently interchangeable except in the case of a device which is purportedly a line tracer but in fact functions as an edge tracer by neglecting the opposite edge of the line and treating the line as having one edge only.

Typical examples of optical pattern followers may be seen in U.S. reissue Patent No. 25,581 and U.S. Patent No. 2,933,668 both assigned to the assignee of the present application. In both of the preceding patents the optical system described utilizes a scanning system which produces relative motion and was based upon the advantages of an alternating current signal as opopsed to direct current signal.

Many systems have been proposed previously which utilized a direct current signal but most, due to the variations caused by thermal and optical instability of the optical detecting devices, were not satisfactory and were not capable of producing repeatable results.

It is an object of this invention to provide a line tracing system which does not utilize a mechanical scanning apparatus for producing relative motion and which utilizes only the DC signals generated by optical viewing of the line but which nevertheless is stable and is capable of producing consistently repeatable results.

It is a further object of this invention to provide a simple optical viewing head for a line tracing apparatus.

It is a further object of this invention to provide a suitable servo amplifying system for co-operation with a line tracing optical head for producing suitable steering signals.

These and other objects are provided in accordance with our invention by incorporating a pair of photo transistors and a suitable light source within a single casing, mounting the casing for adjustment by a simple means and providing electrical connections from the mounting means to an amplifier and control system which is balanced in such a manner as to eliminate inaccuracies caused by thermal drift and varying illumination and also it is so arranged as to provide a desirable form of damping for the steering motor.

Figure 1:
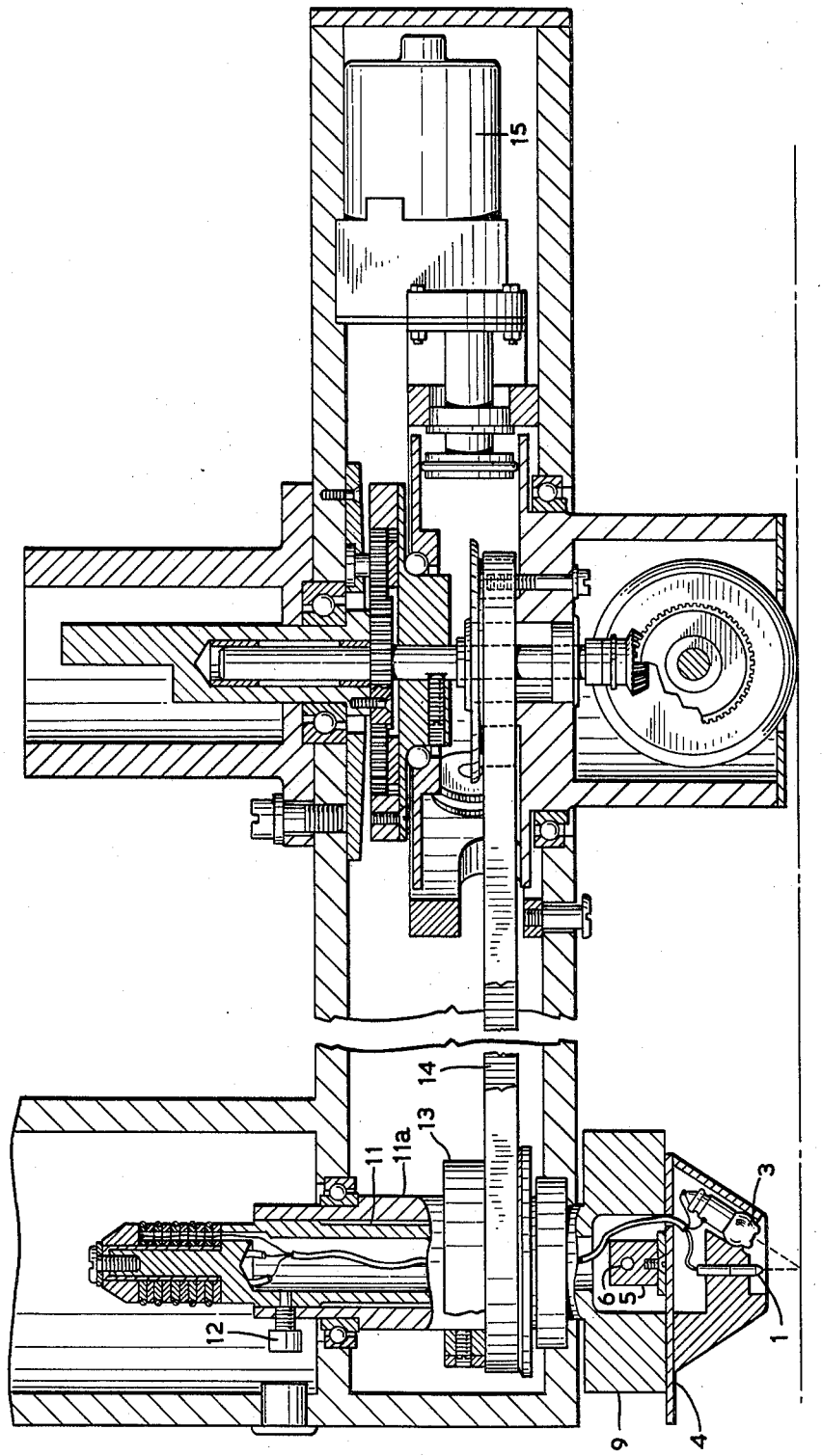
Figure 2:
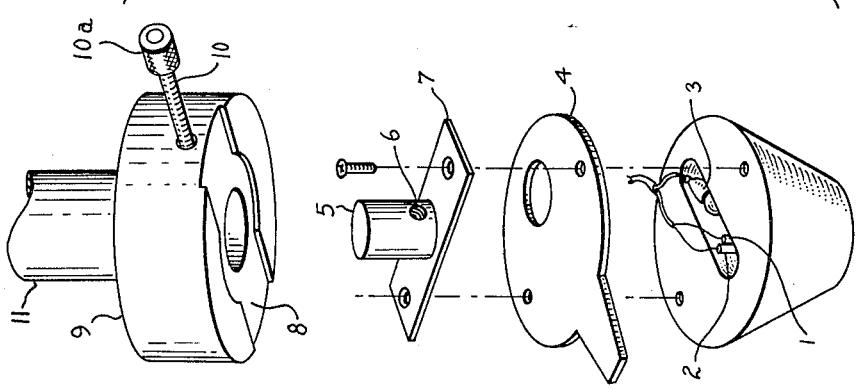
Figure 4:
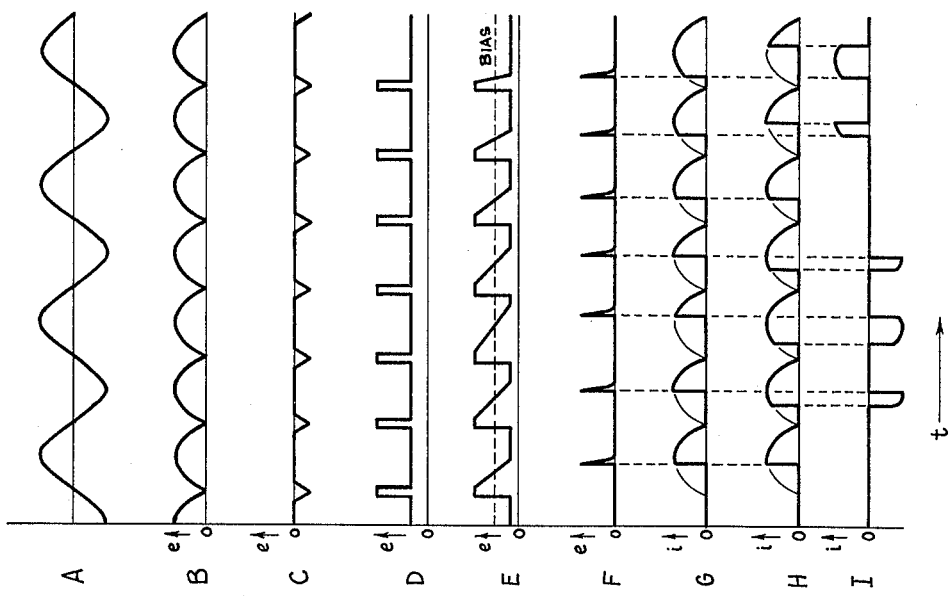
Figure 3:
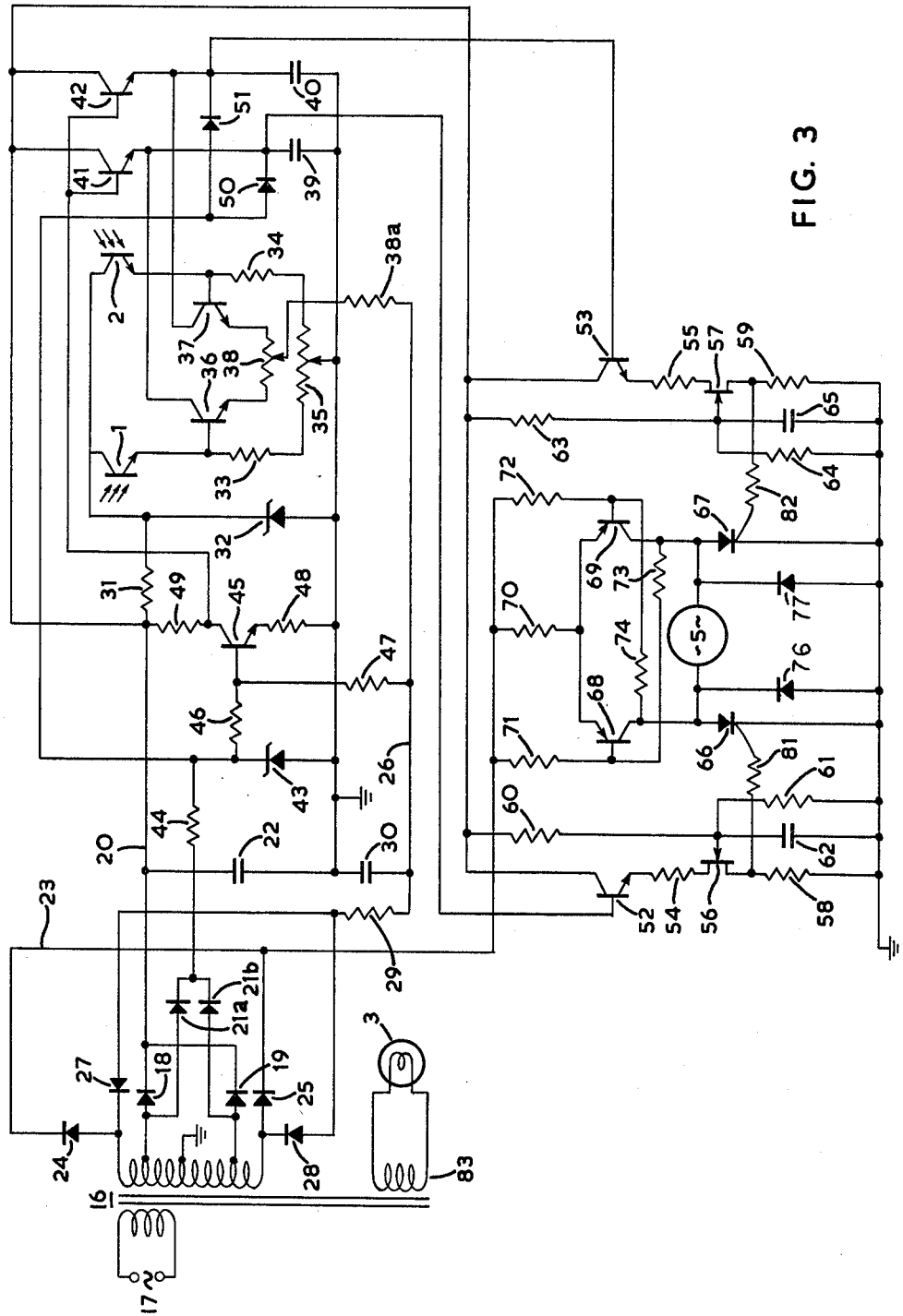

A clearer understanding of the invention may be had from consideration of the following specification and drawings, in which, FIGURE 1 is a sectional view of a portion of the line tracer drive mechanism including the optical sensing head, FIGURE 2 is an exploded view of a portion of such head, FIGURE 3 is a schematic diagram of an electronic circuit in accordance with the invention and, FIGURE 4 is a series of waveforms useful in explaining the operation of the circuit shown in FIGURE 3.

Considering first FIGURE 1 there is shown a drive mechanism which is more fully described in copending application of George S. Jewell, Ser. No. 497,996, filed Oct. 19, 1965. At the left-hand side of this figure there is also shown an optical sensing head consisting of a lower unitary assembly including a pair of photo transistors 1 and 2 and a lamp 3 which serves to illuminate the field of view of the photo transistors 1 and 2. This assembly is mounted on adjusting plate 4 from which protrudes a stud 5 having therethrough a threaded hole 6.

A clearer view of this combination of elements may be had from FIGURE 2. The stud 5 is mounted on a strap 7 adjacent the mounting plate 4. This strap 7 fits within a slot 8 in a disc 9. Passing through the disc 9 is a threaded rod 10 on which are mounted, at its opposite ends, knurled nuts 10A. The nut on the far side of the shaft is obscured by the disc 9. The disc in turn is mounted on a hollow tube 11 and slip rings are mounted on the upper end of tube 11. Suitable electrical interconnections are provided between the photo transistors and the lamp and the slip rings in order that conections may be made between these devices and the electrical control system. The tube 11 is retained within a hollow sleeve 11A by means of thumb screw 12 and mounted on the sleeve 11A is a gear 13 which is mechanically intercoupled with the drive mechanism by a belt 14.

In operation of the apparatus it is necessary that the rotational motion of the optical head be coordinated with the rotational motion of the drive mechanism. The means of obtaining this coordination is more fully explained in the previously referred to copending application but it will be obvious that the belt 14 provides the necessary intercoupling between these two portions.

It will be understood that the signals derived from the optical steering portion are utilized for energizing the steering motor 15 in the drive mechanism. In operation the optical sensing head is located immediately above a pattern to be traced which pattern consists of a line. Transistors 1 and 2 are so aligned that their conical fields of view slightly overlap and when properly related to the pattern each field of view substantially equally intercepts the pattern. The pattern is illuminated by the lamp 3. The light reflected from the pattern is received by the photo transistors and their conductivity is a function of their illumination, that is a function of the degree of intercept between their conical field of view and the pattern, which is assumed to have a different reflectivity than its surround. The signals from the photo transistor are applied to the control circuit illustrated in FIGURE 3.

As will be seen in FIGURE 3 the control circuit includes a transformer 16 having a primary winding coupled to a source of alternating current at terminals 17 and having a secondary which is grounded at a centre point and provides various potentials to a series of diodes. Diodes 18 and 19 provide a full wave rectified output to conductor 20. This output is filtered by means of capacitor 22. Diodes 21a and 21b provide a corresponding but unfiltered output to resistor 44. A higher potential is provided to conductor 23 through diodes 24 and 25 further potential, negative with respect to ground, is provided to conductor 26 through diodes 27 and 28. This negative supply is filtered by resistor 29 and 30 to provide a constant negative DC potential on conductor 26. Transformer 16 also provides a suitable supply from winding 83 to the lamp 3.

The photo transistors 1 and 2 are provided with a potential on their collectors from conductor 20 through resistor 31 stabilized by Zener diode 32. The emitters of these transistors are connected through resistors 33 and 34 to opposite ends of a potentiometer 35. The sliding contact of this potentiometer is connected to ground.

Also connected to the emitters of photo transistors 1 and 2 are the bases of a pair of transistors 36 and 37. The emitters of these transistors are connected to opposite ends of potentiometer 38 and the sliding contact of this potentiometer is connected to the negaive suply line 26 through resistor 38A. The collectors of transistors 36 and 37 are connected to a pair of capacitors 39 and 40. The remaining terminals of these capacitors are connected to ground.

Also connected to the ungrounded side of capacitors 39 and 40 are the emitters of a pair of transistors 41 and 42. The collectors of these transistors are connected to the positive supply line 20 while their bases are connected together and supplied with impulses from the circuit to be described. This circuit consists of Zener diode 43 which is supplied with fullwave rectified unsmoothed impulse through resistor 44. The Zener diode limits the amplitude of these impulses and applies the resultant waveform to the base of transistor 45 through resistor 46. The base of this transistor is also returned to the negative supply line 26 through resistor 47. The emitter of this tranistor is connected to ground through resistor 48 and the collector is connected to the positive supply line 20 through resistor 49. The waveform on the collector of transistor 45 is applied to the bases of transistors 41 and 42.

The upper terminals of capacitors 39 and 40 are also connected through diodes 50 and 51 respectively to the regulated potential appearing at the end of resistor 44, the value of which is determined by Zener diode 43.

The waveforms appearing at the upper terminals of capacitors 39 and 40 are applied to the bases of transistors 52 and 53 respectively. The collectors of these transistors are connected to the positive supply line 20 and their emitters are connected through resistors 54 and 55 to pair of unijunctions 56 and 57. The other base connections of the unijunctions are connected through resistors 58 and 59 respectively to ground. The emitter of each unijunction is provided with a positive potential from a potentiometer network. In the case of unijunction 56 this potentiometer network consists of resistor 60 and resistor 61 by-passed by capacitor 62 and in the case of unijunction 57 it consists of resistor 63 and resistor 64 by-passed by capacitor 65. The lower base connection of each of these unijunctions is connected to the trigger electrode of the silicon controlled rectifier 66 and 67 respectively through resistors 81 and 82. The cathodes of these silicon controlled rectifiers are connected to ground and their anodes are connected to a direct current steering motor 5.

Also connected to the anodes of the silicon controlled rectifiers are the collectors of a pair of transistors 68 and 69. The emitters of these transistors are connected together and to the fullwave rectified supply on conductor 23 through resistor 70. The bases of these transistors are connected to the same supply through resistors 71 and 72 and the base of each of these transistors is also connected to the collector of the opposite transistor through resistors 73 and 74 respectively.

A pair of diodes 76 and 77 are connected one from each terminal of motor 5 to ground.

Operation of the system

As was previously explained, in operation the optical following sensing head is arranged adjacent the pattern and the degree of illumination of the photo transistors is dependent upon the intercept of their conical angle of view and the pattern. With equal intercept both photo transistors will conduct equally, with unequal intercept one will conduct more than the other. The various waveforms in FIGURE 4 are illustrative of the waveforms in FIGURE 4 are illustrative of the waveforms which may appear at various points of the circuit. Waveforms A, B, C, D, E and F are graphs of voltage in a vertical direction versus time in a horizontal direction. Waveforms G, H and I represent current in a vertical direction and time in a horiozntal direction. All the time axis are coordinated and the waveform at A is a representation of the supply voltage which is used as a time reference. At B is shown the fullwave rectified supply appearing on condutcor 23 for example. At C is shown the limited waveform appearing at the junction of Zener diode 43 and resistor 44. At D is shown the waveform produced at the collector of transistor 45.

Let us assume that photo transistors 1 and 2 are equally illuminated and are equally conductive. By adjustment of the slider of potentiometer 35 the bases of transistors 36 and 37 may be assumed to have been arranged to be of such a potential that the conduction of both transistors is equal. With each pulse produced at the collector of transistor 45, transistors 41 and 42 are caused to become conductive. When they are conductive they charge capacitors 39 and 40 from the positive supply line 20. As soon as they become non-conductive, capacitors start to discharge through the transistors 36 and 37. The rate at which these capacitors discharge is a function of the current provided through collector emitter circuit of these transistors. Since the base potential is a function of the conductivity of the photo transistors it will be seen that the rate at which the capacitors discharge is in fact a function of the illumination falling on each one of the two photo transistors.

As shown in the first waveform illustrated at E in FIGURE 4 the capacitors charge up to a given potential and then start to discharge when the pulse on the transistor 41 for example terminates. This gradually decreasing potential is applied to transistors 52 and 53. These transistors in turn apply exactly the same wave shape to the unijunctions 56 and 57. The unijunctions by virtue of their nature become conductive at a point determined by the bias potential supplied by the potentiometers and the decreasing voltage applied through transistors 52 and 53. At such point they apply impulses of the type shown at F in FIGURE 4 to the gates of the silicon controlled rectifiers 66 and 67 through current limit resistors 81 and 82. This causes silicon controlled rectifier 66 to become conductive as shown at G in FIGURE 4 and also causes silicon controlled rectifier 67 to become conductive as shown at H in FIGURE 4. When these silicon controlled rectifiers are both conductive the terminals of motor 5 are short circuited and no current can be applied to the motor. This is the condition shown in the first waveform.

In the second waveform, however, it is assumed that the conductivity of one of the two transistors 36 and 37 has changed due to a change in illumination of one of the photo transistors. It is assumed that the illumination of photo transistor 1 has decreased thus decreasing the collector emitter current of transistor 36 and causing the voltage on capacitor 39 to fall more slowly than the voltage on capacitor 40. This more gradual slope is shown in the second waveform illustrated at E in FIGURE 4.

Since the fall of potential is more gradual the coincidence of the waveform and the bias supplied to unijunction 56 occurs at a later time. Therefore the second impulse shown at F in FIGURE 4 occurs at a later time in the cycle considering the sinusoid at A as a reference. This in turn causes the silicon controlled rectifier 66 to conduct at a point later in time with reference to the reference sine wave than it did in the previous waveform. If the illumination on photo transistor 1 decreased the illumination on photo transistor 2 must increase. The waveform at the base of transistor 53 must therefore have a steeper slope and the trigger signal from unijunction 57 will occur earlier in time. This causes silicon controlled rectifier 67 to conduct at a point earlier in time as shown in the second waveform at H in FIGURE 4.

The current through motor 5 is determined by the difference between the conduction periods of the two silicon controlled rectifiers. For example when silicon controlled rectifier 67 begins to conduct first, this decreases the potential at the base of transistor 68 causing this transistor to become conductive and current flows from the conductor 23 down through resistor 70 through transistor 68 through the motor 5 and down to ground through silicon controlled rectifier 67. At a later point in time silicon controlled rectifier 66 becomes conductive causing the base of transistor 69 to become more negative causing transistor 69 to become conductive. With both silicon controlled rectifiers conducting, however, the current now flows down from conductor 23 through resistor 70 through both the transistors 68 and 69 and down through both the silicon controlled rectifiers 66 and 67. The current therefore is not forced to flow through the motor 5. With both silicon controlled rectifiers conducted, the terminals of motor 5 are effectively short circuited, thus producing a high damping torque.

The third waveform illustrated in E of FIGURE 4 illustrates a condition where the illumination on photo transistor 1 has decreased even further, thus further delaying the point of conduction of silicon controlled rectifier 66 and causing the motor to receive a still greater pulse of current as illustrated at I in FIGURE 4. The fourth waveform represents the condition similar to the second waveform but the fifth waveform represents the condition where no conduction occurs because both silicon controlled rectifiers become simultaneously conductive. The sixth waveform represents the reverse condition where silicon controlled rectifier 66 becomes conductive before silicon controlled rectifier 67 and the seventh waveform represents a still greater example of the same case.

It will be appreciated, of course, that the silicon controlled rectifiers become non-conductive when the waveform applied to them as illustrated at B in FIGURE 4 reaches a zero point and they do not again become conductive until fired by a pulse from the unijunctions.

The periods of conduction illustrated at 1 in FIGURE 4 are typical periods of conduction which would occur in the event of the optical sensing head being first centered on the pattern then progressing to one side of the pattern returning to alignment and then progressing to the other side of the pattern with a substantially equal deviation from the pattern on each side. This indicates that the period of conduction of the motor is a function of the deviation of the optical sensing head from the center of the pattern and the direction of conduction is a function of the direction of deviation.

Since these pulses are applied to motor 5, they cause the motor to rotate at a speed and with a direction determined by the duration and direction of the pulses. The motor in turn causes the drive mechanism to be steered, turning at a rate determined by the speed of rotation of the motor 5 and in a direction governed by the direction of rotation of the motor 5. By proper correlation of the optical sensing head and the drive mechanism, the optical sensing head is caused to rotate until the illumination of the photo transistors is substantially equal.

Diodes 76 and 77 perform two functions, they protect the silicon controlled rectifiers from reverse voltage and also provide additional damping when the controlled rectifiers are nonconducting.

It will be noted from the FIGURE 1 that the photo transistors are slightly in advance of the point of rotation of the optical sensing head. Therefore as the head is rotated, the photo transistors tend to swing around the point of rotation until they straddle the line. At the same time the drive wheel of the driving mechanism rotates on its axis driving the mechanism forward in the direction determined by the direction of the viewing head. As the machine moves forward in this direction any deviations of or from the pattern being traced causes a rotation of the optical sensing head in such a direction as to re-center the photo transistors over the line. By selection of the sensitivity of the control system, the apparatus may be caused to closely approximate the pattern to be followed.

It will also be noted that while the system is designed to provide a high degree of gain, that is a slight deviation of the line from the path of the photo transistors will cause a rapid rotation of the motor, at the same time the motor damping is inversely proportional to the deviation of the optical sensing head from the center of the pattern. This relationship between error signal and damping is highly desirable in any servo control system since its permits high performance and stability to be obtained at the same time.

The mechanical design of the optical sensing head provides certain advantages. The assembly including tube 11 and the photo transistors and lamp may be removed for servicing or replacement simply by releasing thumb screw 12. Since the brushes are simple wire springs the whole assembly can then be withdrawn downward, like a plug from a telephone jack, without any further electrical connectors being separated. When the assembly is replaced the wire springs slip over the end of tube 11 and reseat themselves in the appropriate slip rings.

It will also be noted that the position of the photo transistors relative to the centre line of tube 11 may be adjusted by turning rod 10. Rotation of the rod cause transverse motion of plug 5 which in turn moves plate 4 and the lower cone including the lamp and photo transistors transversely relative to disc 9. This adjustment is useful in allowing for kerf in gas cutting. By suitable adjustment of rod 10 the axis of tube 11 may be caused to trace a path offset from the centre of the pattern while the photo transistors continue to trace the centre of the pattern. Since the cutting torch follows the path traced by the axis of tube 11 the torch may similarly be caused to follow a path offset from the pattern in such a way that the material removed by the torch or the kerf is removed from the surplus material and the portion remaining is the same dimension as the pattern being followed. The degree of transverse adjustment required will depend upon the actual kerf cut by the torch and the plate 4 is provided with a tab in front which may be calibrated, in conjunction with a mark on disc 9, to indicate the width of kerf compensated for by a given transverse adjustment.

Potentiometers 35 and 38 are used in the setup of the machine and should be adjusted as follows:

With the machine energized but free of the table and with the photocells unilluminated, by running the optical sensing head off the paper so that no light is reflected back for example, the slider of potentiometer 38 is adjusted until the motor does not turn either direction. The optical head is now equally illuminated by running it over a white sheet of paper. The slider on potentiometer 35 is now adjusted so the motor 5 is once more stationary. This balances the photo transistors.

While the apparatus has been shown in conjunction with a specific mechanical drive, it will be understood that the signals produced and the steering motor caused to rotate thereby may be associated with any form of drive mechanism, for example the drive mechanism illustrated in U.S. Patent No. 2,933,668 referred to previously. It will also be appreciated that, while shown in conjunction with such a steering mechanism, the signals produced by the photo cells and the resultant energization of the motor may be used for other purposes. It is only pertinent that the rotation of the motor is a function of the displacement of a line or the relative illumination of the two photo cells. It is evident that this particular control system has many uses and the advantages of the motor drive described will be appreciated by those skilled in the art.

The embodiments of the invention in which an exclusive property or privilege is claimed is defined as follows:

1. An optical pattern tracer comprising a tube mounted for rotation in a base plate; a pair of photo transistors mounted adjacent one another a first distance apart at one end of said tube with their optical axes substantially parallel to the rotational axis of said tube and substantially equidistant from said rotational axis so that a line joining their optical axes does not pass through said rotational axis; a surface bearing a pattern to be traced adjacent but spaced a second distance from said one end of said stube and essentially perpendicular to the rotational axis of said tube; a lens associated with each of said photo transistors to confine the angle of view of each photo cell to that space enclosed by a conical surface, the first distance and the second distance and the angle of view of the photo cells being so selected that the circular areas defined by the conical surfaces at the surface bearing the pattern overlap; a light source within said tube directed towards the pattern bearing surface and illuminating said surface in the areas viewed by said photo transistors with a substantially uniform illumination independent of the rotation of said tube; a steering motor to rotate said tube in accordance with the reflected illumination falling on said photo transistors so as to maintain said reflected illumination equal on both transistors; a direct current amplifier; means to apply the output from said photo transistors to said direct current amplifier and means to control said steering motor in accordance with the output from said amplifier.

2. An optical pattern tracer comprising a tube mounted for rotation in a base plate, a pair of photo transistors mounter adjacent one another at one end of said tube with their optical axes substantially parallel to the rotational axis of said tube and substantially equidistant from said rotational axis so that a line joining their optical axes does not pass through said rotational axis; a surface bearing a pattern to be traced adjacent but spaced from said one end of said tube and essentially perpendicular to the rotational axis of said tube; optical means associated with said photo transistors to define a conical angle of view for each transistor such that their angles of view partially overlap at said surface; a direct current steering motor whose direction of rotation is dependent upon the direction of current applied to said motor to rotate said tube in accordance with the illumination of said photo transistors so as to maintain said illumination equal on both transistors; means to control said steering motor comprising a source of discontinuous current, a first silicon controlled rectifier, a first power transistor and means to couple said first rectifier and said first transistor in series in that order across said source, a second silicon controlled rectifier, a second power transistor and means to couple said second rectifier and second transistor in series in that order across said source with the same polarity as said first rectifier and transistor, means to couple the steering motor from the junction of the first rectifier and transistor to the junction of the second rectifier and transistor, means controlled by outputs from said direct current amplifier to trigger said rectifiers into their conductive state and means to cause said second transistor to become conductive when said first rectifier conducts and means to cause said first transistor to become conductive when said second rectifier conducts whereby the duration and direction of current pulses through the motor is a function of the order and duration of the conductive periods of said rectifiers.

3. An optical tracer as claimed in claim 2 wherein the discontinuous supply is rectified alternating current.

4. An optical tracer as claimed in claim 2 wherein said means to trigger said rectifiers into their conductive states includes a pair of unijunctions to which are applied reference voltages and ramp voltages said ramp voltages being derived from the outputs of said direct current amplifier.

References Cited

UNITED STATES PATENTS

| | | | |
|---|---|---|---|
| 3,354,311 | 11/1967 | Vali et al. | 250—210 X |
| 2,723,845 | 11/1955 | Przybylki et al. | 250—202 |
| 3,137,809 | 6/1964 | Freiberg | 318—293 |

FOREIGN PATENTS

| | | |
|---|---|---|
| 1,063,690 | 3/1952 | German. |
| 1,330,245 | 5/1963 | France. |

ROBERT SEGAL, Primary Examiner

U.S. Cl. X.R.

318—293, 300; 250—209, 236, 239